Sheet 1 - 2 Sheets.
W. S. MacLaurin,
Penmanship,
Nº 12,391. Patented Feb. 13, 1855.
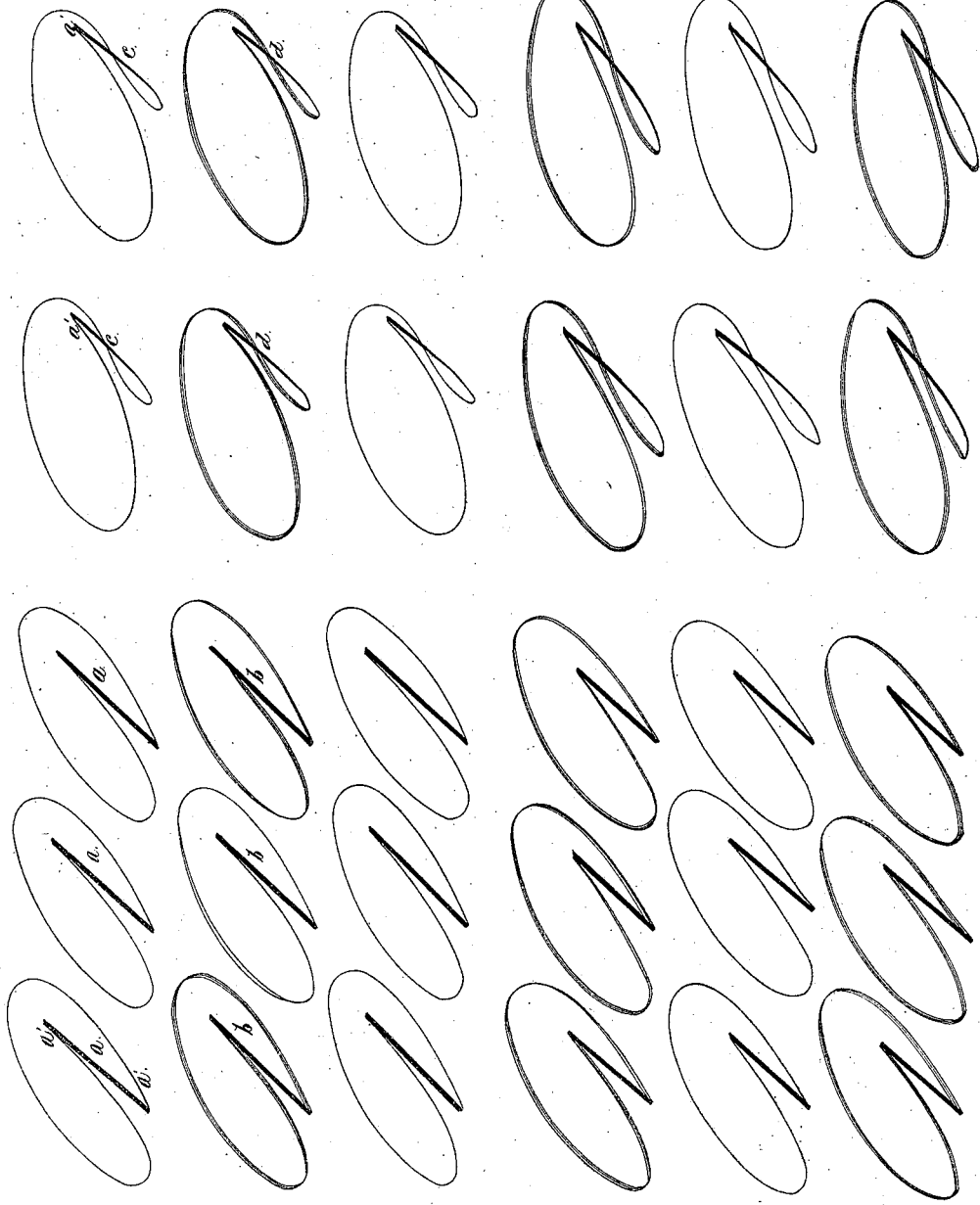

W. S. MacLaurin,
Penmanship,
Nº 12,391. Patented Feb. 13, 1855.
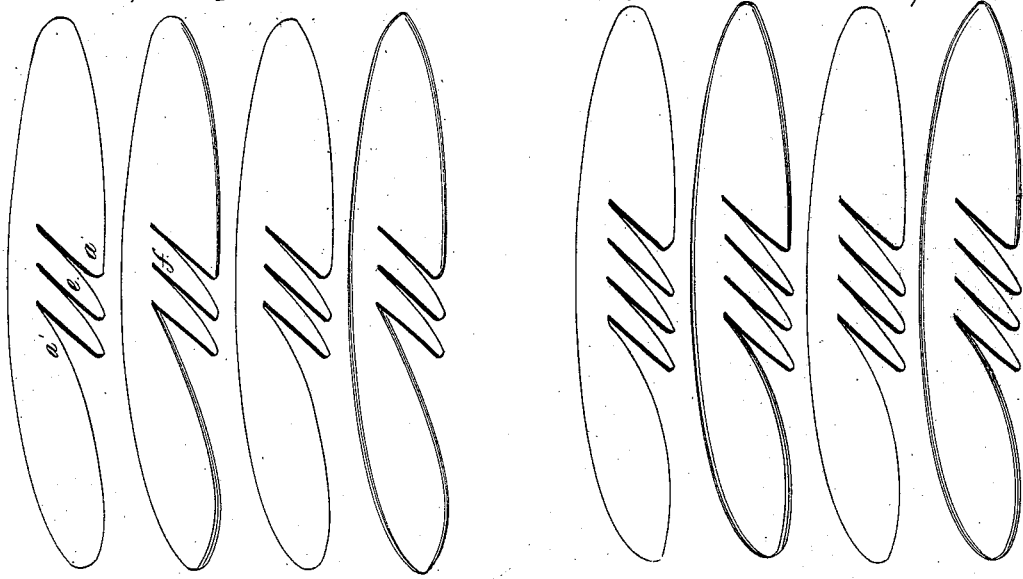
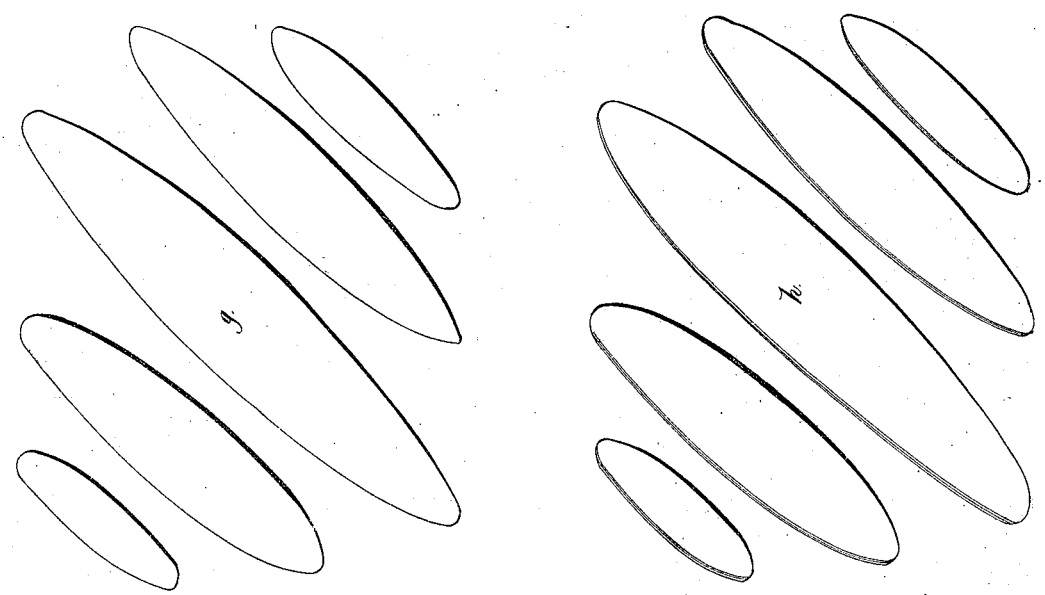

UNITED STATES PATENT OFFICE.

WILLIAM S. MacLAURIN, OF NEW YORK, N. Y.

METHOD OF TEACHING PENMANSHIP.

Specification of Letters Patent No. 12,391, dated February 13, 1855.

*To all whom it may concern:*

Be it known that I, WILLIAM S. MACLAURIN, of the city, county, and State of New York, have invented a new and Improved Method of Teaching Penmanship; and I do hereby declare that the following is a full, clear, and exact description of the same, reference being made to the annexed drawings, making a part of this specification, in which similar letters refer to similar parts throughout.

My improvement upon the various systems heretofore existing, consists in forming a series of diagrams, models or patterns, so that each one of said diagrams, models or patterns shall be endless, the object of which is to enable the pupil to pass continuously over the same for any given length of time, without removing the pen, pencil, or stylus therefrom, till an equal and exact movement is attained in the desired direction, by which any amount of manual practice can be had without using an unusual or unreasonable amount of stationery, the amount of practice upon a given pattern being only limited by the durability of its composition.

The forms of which my system is composed are employed in two different ways, either engraved, impressed, embossed, or cut in tablets or slates, or other proper material, or printed or written on paper to be traced over, or on tablets of any suitable material. In the first of these modes the pupils employ a stylus pencil or hard point, and trace the curves or other forms as rapidly as possible, over and over again; and in the second they use pens and ink. The main feature however, consists in attaching to each letter, word, part of a word, or other form on which the principles of writing are based, a guiding or connecting loop, which continues from the terminating point of the letter, word, or other form, to the place of commencement, so that the whole letter, word, is repeated an indefinite number of times, without taking the hand from the tablet or paper. Hence the hand of the pupil has but one act of the will to perform, instead of several, as in the case of repeating the letters seriatim, as in the old method.

These forms or models are to be retraced over and over again, until the greatest rapidity and freedom has been attained as well as the most exact conformity to the form or model.

By my system the mind and action of the pupil being intent upon the performance of but one single act, namely, the retracing of the form over and over again, until the greatest rapidity and exactness is acquired, he is insured freedom of action, quickness of execution, correctness, legibility, in short, all that is requisite for a perfect penman.

I have taught young children to attain the extraordinary speed of twenty folios, or 2,000 words per hour, while fourteen to fifteen hundred is the maximum of the most skillful scrivener, the ordinary rate being from ten to twelve folios per hour.

Another feature of my invention is the reduction in time required in teaching as well as the ability to impart the art to all in nearly an equal degree. In the old mode the pupil spends years of his life in tediously copying letter after letter, and word after word slowly, and rarely attaining excellence in the art. Hence it is common to say of good penmen "they are so by nature," *i. e.*, possess the power of imitation in a superior degree. Now by my system I prepare a full set of engraved models, or patterns, being forms embracing the elementary principles of writing, beginning with the simplest and terminating with the most complex. By the time the pupil has gone through with my course, he has been required to execute by overrunning or retracing, as rapidly as possible, some 20,000 times, all the principles embraced in writing and hence the great mechanical accuracy acquired. The consequence is, to bring all nearly on the same level as to ability to acquire the art.

In Castair's system an attempt is made to give facility of execution to the muscles of the hand and arm, by continuing the pen upon the paper while writing across the whole page; and he even carries it further, and in some of his copies even show a whole page written with a single line; but this does not accomplish the especial and most important advantages to be derived from my system, viz, a repetition of the same movement for an indefinite number of times, without removing the pen from the paper, and secondly, greatly economizing, by using the same models for a long continued practice, which simplifies and systematizes the movements of the pupil without calling into action any of the powers of imitation in the degree absolutely necessary in all other systems yet devised.

Having thus compared my improvement in the art of teaching writing with the old mode, I will describe the manner of giving instruction by reference to the drawings hereto annexed.

At (*a, a,*) is shown the usual first form given to pupils, viz, a straight stroke or mark; the ordinary mode is to continue to copy these one after the other, until a straight line can properly be made. It is well known what a wearisome operation this is to the child, and also how slow the progress; now by my improvement, instead of allowing the pupil to go on to duplicate the copy, I connect the top and bottom of the stroke by a graceful loop (*a',*) (*a'*). The pupil, instead of attempting to imitate this by copying it is required to trace over it without lifting the stylus out of the groove, if he is being instructed upon tablets, or otherwise, the pen from the paper, if from printed or other like prepared forms. The movement is slow at first, gradually increasing in speed as the movement of the hand becomes accustomed to the form; this is continued until the letter can be traced over with the greatest rapidity, and exactness, some fifty or sixty times in a minute.

At (*b*) is an example of (*a*) as traced over by a pupil, at the rate of fifty times a minute.

The combination of the loop of connection with the rigid straight mark, causes the hand to be released from a rigid grasp of the pen, and soon produces a natural and easy motion in following its lines; this is the true secret of elegant and rapid penmanship.

The combination of the loop, or flourish, with the written letter or form, embraces two separate and distinct motions, viz, the motion of the hand and arm, to produce said loop, the fingers in the meanwhile remaining fixed; and the motion of the fingers to produce the letters or form, while the hand and arm are at rest.

(*c*) represents a second form farther advanced; here it will be seen how naturally the loop of connection runs a part of the regular formation of the letter (*d*), showing the same retraced by a pupil fifty times in a minute; at (*e,*) is seen the form, in a further stage of advancement; (*a'*) showing the loop of connection and continuation; (*f,*) is the same, with the exercises completed; (*g, h,*) are large detached loops for exercises, to be retraced in the same rapid manner.

These exercises are, so to speak, gymnastics for the hand and arm, and by which finally the greatest certainty, freedom, power of endurance, as well as rapidity of execution are attained; for when the course has been properly passed through, each form being gone over about twenty thousand times; the result is to carry the hand with unerring certainty to any point of the page, leaving the fingers to perform the mere digital duty of tracing the simple elementary form and letter.

Having now set forth the distinguishing features of my invention what I claim as my improvement and desire to secure by Letters Patent is—

The employment of figures such as described, marked on or formed in the surface of a tablet, slate, or other surface for the purpose of aiding the hand in guiding the point of a pen, pencil, or stylus in retracing therewith the lines of the said figures an indefinite number of times as described to train the hands of pupils in teaching them the art of writing.

W. S. MacLAURIN.

Witnesses:
   Thomas D. Stetson,
   T. N. Greenough.